Figure 1:
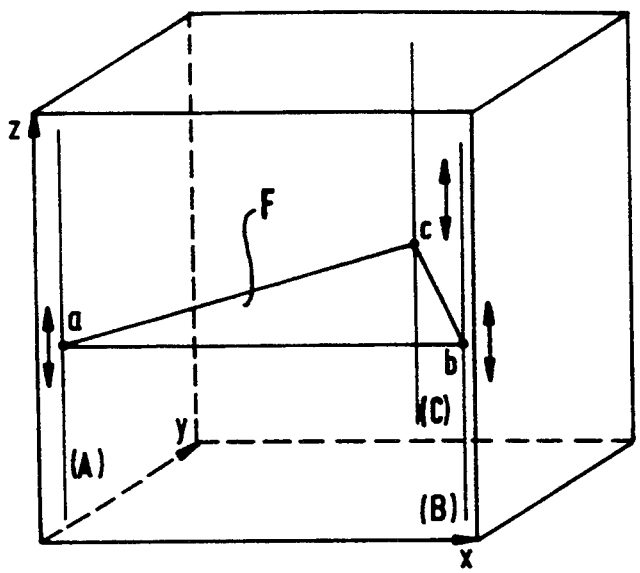

United States Patent [19]

Schiltz

[11] Patent Number: 5,388,042

[45] Date of Patent: Feb. 7, 1995

[54] METHOD FOR MOVING, WITH AT LEAST THREE DEGREES OF FREEDOM, PARTICULARLY IN THEATRE AREA ON OR BELOW A STAGE, A COMPLEX THREE-DIMENSIONAL STRUCTURE

[76] Inventor: Jean-Marie Schiltz, 37, Rue Marie-Adelaïde, L-4837 Rodange, Luxembourg

[21] Appl. No.: 948,125

[22] Filed: Sep. 21, 1992

[30] Foreign Application Priority Data

Sep. 27, 1991 [LU] Luxembourg ............... 88009

[51] Int. Cl.⁶ .................................. G06F 15/46
[52] U.S. Cl. .................... 364/167.01; 364/474.35; 318/569
[58] Field of Search ............ 364/167.01, 478, 474.28, 364/474.35, 474.34; 318/570, 571, 626, 574, 625

[56] References Cited

U.S. PATENT DOCUMENTS 5,153,490 10/1992 Ueta et al. ..................... 318/571

Primary Examiner—Roy N. Envall, Jr.
Assistant Examiner—Cameron H. Tousi
Attorney, Agent, or Firm—Thomas S. Baker, Jr.

[57] ABSTRACT

A method for moving with at least three degrees of freedom, particularly in theatre area on or below a stage, a complex three-dimensional structure, which is borne by several lifting machines or the like to be driven independently, is described. Three virtual parallel reference axes are installed in the space on which, as a function of one positioning signal in each case per point of application up or down movements are made. A virtual surface is drawn by these points of application. Several independent lifting machines or the like are installed above or below this surface. A weighting is determined for each lifting machine as a function of their position compared to each reference axis, which weighting is a measure of the amount by which the running of the relevant machine is influenced by the movement of the points of application on the reference axes. The movement and speed of movement of the points of application on the reference axes are predefined as positioning signals. Partial control signals are created according to the proportions of the influence on them by the movement of the points of application via the weighting for each machine. The partial control signals for each machine are summated and fed to the individual assigned machines as an overall control signal.

6 Claims, 2 Drawing Sheets

WEIGHTING A = 100%
WEIGHTING B = 0%
WEIGHTING C = 0%

WEIGHTING A = 50%
WEIGHTING B = 50%
WEIGHTING C = 0%

WEIGHTING A = ~ 33%
WEIGHTING B = ~ 33%
WEIGHTING C = ~ 33%

METHOD FOR MOVING, WITH AT LEAST THREE DEGREES OF FREEDOM, PARTICULARLY IN THEATRE AREA ON OR BELOW A STAGE, A COMPLEX THREE-DIMENSIONAL STRUCTURE

The present invention concerns a method for moving, with at least three degrees of freedom, particularly in the theatre area or below a stage, a complex three-dimensional structure, which is borne by several lifting machines or the like to be driven independently.

The method can be used wherever machines work distributed over and/or above a virtual surface, whether by descending rope systems or by lifting podiums, particularly the upper or lower machinery on stages in theatres, operas, playhouses, concert halls, multi-purpose halls or the like. In this connection the very frequently complex structure must be moved. A complex structure means a backdrop or object which, on account of its shape, function or weight, has to be suspended or supported at several points.

At present it is possible to shift complex structures which hang at several points either in time synchronicity or path synchronicity. In path synchronous travel all machines affected follow the same path of travel (possibly with varying start and target positions). In time synchronous travel all affected machines cover different paths in the same time. The common feature of these travels possible so far is that corresponding positions of the other machines are assigned to each position of each machine; this means, an individual degree of freedom of movement exists, i.e. normally lifting or lowering exists. The movement itself is normally triggered by a joystick, whose deflection compared to the zero position is a measure of the speed. Tilting and rolling movements are only possible insofar as their target and end positions have to be determined and input beforehand. So far, it has not been possible to carry out such a movement freehand, to improvise it.

The problem of the invention is to prepare a method in which it is possible to move a structure, which is fixed to several independent machines, which are distributed over and/or below a virtual surface, in space with at least three degrees of freedom (or on the surface with two degrees of freedom), whereby the erection of the structure becomes simplified and repeatable, likewise the movement of the structure itself.

This problem is solved by the method according to the invention in that three virtual parallel references axes are installed in the space, on which as a function of a positioning signal in each case per point of application up and down movements are carried out, in that a virtual surface is pulled through these points of application, in that several independent lifting machines or the like are installed over or below this surface, in that a weighting is determined as a function of their position compared to each reference axis for each lifting machine which is a measure of the amount by which the running of the relevant machine is influenced by movement of the points of application on the reference axes, in that the direction and speed of movement of the points of application on the reference axes are preset as positioning signals, in that via the weighting for each machine partial control signals are produced corresponding to the proportions of their influence by the movement of the points of application, in that the partial control signals for each machine are summated and fed to the individually assigned machines as an overall control signal.

According to the invention, not only one partial control signal is used for the affected machines but according to whether a movement with two or three degrees of freedom is to be achieved, two or three thereof.

With this invention it is possible to set up complex structures simply, without any explicit calculation of any start or target positions of the machines used. The set positions can for example be stored for further use as start or target positions. However, the method also permits the machines to be moved within predefined limits. Either several independent motion levers can be used as a source for the positioning signals so that each of the three points of application which controls the corner point of the virtual surface (or two corner points of the virtual line in the movement with 2 degrees of freedom) on the reference axis, or a special motion lever, called a Space Master, by which means it is possible for one to influence all three required positioning signals with one hand. The mixed use of an independent motion lever and of the special motion lever, called the Space Master, is also possible.

As a further possibility, the positioning signals can also be taken from another source, such as a data medium, and thus follow either a preset program or another externally connected device.

Positioning signals can be stored and retrieved again later. This process is known as teach-in.

Figure 2A:
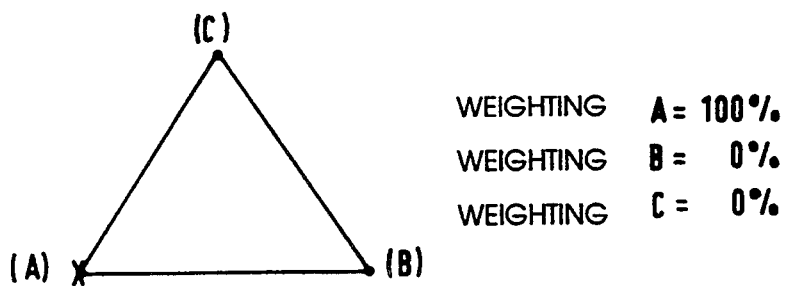
Figure 2B:
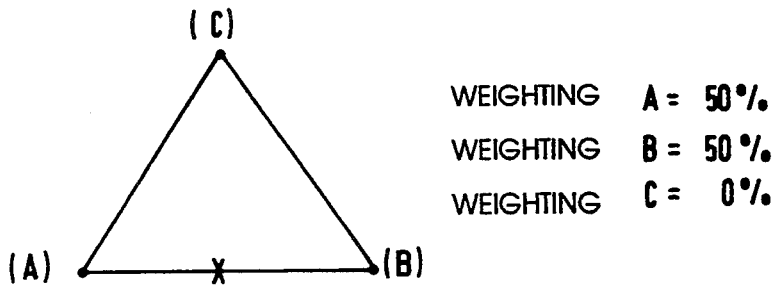
Figure 2C:
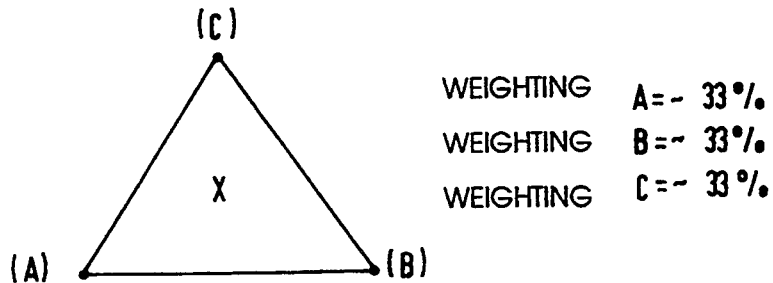

The invention is now described by its use when setting up, moving and/or moving backdrops on a theatre stage, whilst referring to the enclosed drawings. In these:

FIG. 1 is a schematic representation of one application of the invention;

FIGS. 2a–c are diagrams for explaining concepts; and

Figure 3:
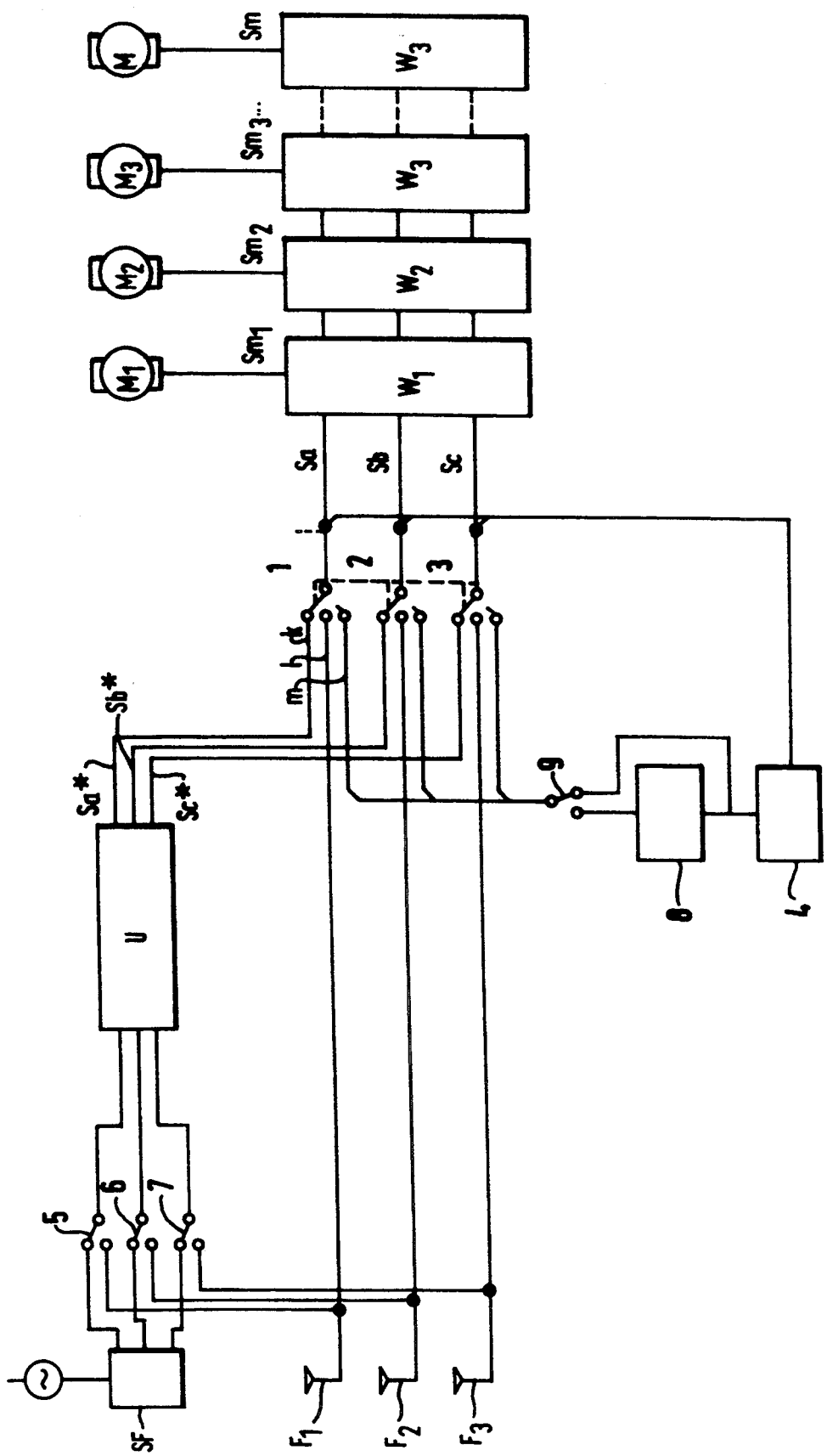

FIG. 3 is a schematic representation of a preferred embodiment of the device for carrying out the process according to the invention.

A stage space with space axes x, y and z is schematically represented in FIG. 1. According to the invention three virtual reference axes A, B and C are installed in the stage space. A virtual surface F which represents the object to be moved is intersected by the reference axes A, B and C at the points of application a, b and c. The media (descending rope systems or lifting podiums) (not shown) bearing the object to be moved (not shown) are arranged above or below the intended surface F. A drive or machine is assigned to each descending rope system or lifting podium.

If the object should now be erected or moved, the movement required for this is preset by means of the positioning signals corresponding to the points of application a, b and c. Each positioning signal shifts a point of application—a, b or c—assigned to it on the corresponding reference axis A, B or C up or down. The reference axes A, B and C are, as already stated, erected in the space and are normally parallel to each other. A different arrangement is possible but makes the calculation process difficult.

The positioning signals are used for moving the points of application a, b and c on the relevant reference axes A, B and C. As the surface is defined by these points of application, it therefore moves with the points of application. As the points of application a, b and c can be moved independently of each other with the aid of the positioning signals on the reference axes A, B and C, there are three degrees of freedom with which this surface can be moved in space.

The several machines or drives (not shown) erected above and/or below the virtual surface F naturally have a different position to each reference axis. Owing to the varying distances between the machines and a given reference axis, the reference axis has a varying influence on the movement of the surface (of the object) caused before each machine via its descending rope system or lifting podium at the site of application of the assigned descending rope system or lifting odium on the object (surface).

If a machine is arranged quite close to or even on a reference axis itself (FIG. 2a, point A), the influence of this reference axis on the machine is 100%. However, if the machine lies above/below the connecting line of the points of intersection b and c of the other two reference axes B and C with the surface F (FIG. 2B, line AB), an influence of zero of the reference axis A emerges here. This influence of the reference axes on the machines or drives is to be described below with weighting. It is obvious that each machine receives as many varying weightings as there are reference axes. The overall effect of the individual machines is obtained by adding their individual effects. The concept of weighting will continue to be explained with the aid of FIG. 2.

The machines are located at a specific distance from the three axes. Each machine is influenced to a certain extent by each axis.

To FIG. 2a: The machine x on the reference axis A is only influenced by the reference axis A; if the points of application on the reference axes B and/or C is moved, this has no influence on the machine x on the reference axis A.

To FIG. 2b: The machine x on the connecting line between the points of intersection a and b (points of application) of the reference axes A and B is influenced by reference axes A and B. By moving the points of application on the reference axes A and/or B the machine is affected. The weighting in each case, however, is only 50% if the machine is located in the centre between the reference axes A and B. If the machine is moved on the connecting line, the influence of the reference axis A or B increases or decreases when the machine approaches the reference axis A or B or moves away from it. Moving the point of application on the reference axis C has no effect on this machine.

To FIG. 2C: The machine x is influenced by all three axes A, B and C. By moving the point of application on the reference axis A and/or B and/or C the machine is influenced each time. This time the weighting is about 33% for each reference axis since in this case the machine lies in the geometric centre.

The determination of the overall positioning signal for a drive occurs according to the following formula:

$$Smx = Wax \cdot Sa + Wbx \cdot Sb + Wcx \cdot Sc \tag{0}$$

Here:

Wax, Wbx and Wcx are the weightings of the machine x per reference axis A, B, C;

Sa, Sb and Sc are the positioning signals of the points of application a, b and c of the reference axes A, B and C; and Smx is the overall positioning signal of the machine x.

By placing the reference axes A, B and C on the corner points of a right-angled triangle, the calculation of the weighting can be simplified somewhat.

The positioning signals for the points of application a, b and c on the reference axes A, B and C can be derived in different ways. On the one hand, conventional motion levers can be used which can be deflected in one dimension (up or down). If only such motion levers are used, then at least three of them are needed.

However, one can also deploy special motion levers which possess at least three different degrees of freedom of movement. For example, these could be: X and Y rotation and Z translation. By converting these signals the positioning signals for the points of application on the reference axes are obtained. Such a motion lever is the Space Master brand from the firm Basys in Erlangen.

The conversion of the X and Y rotation and Z translation signals is made according to the following method:

$$Sa' = a \cdot Tz + b \cdot Rx + c \cdot Ry \tag{1}$$

$$Sb' = a' \cdot Tz + b' \cdot Rx + c' \cdot Ry \tag{2}$$

$$Sc' = a'' \cdot Tz + b'' \cdot Rx + c'' \cdot Ry \tag{3}$$

Here:

Tz, Rx and Ry are the signals which the Space Master supplies:

Sa', Sb' and Sc' are the positioning signals for the points of application A, B and C on the reference axes a, b and c; and a, a', a''
b, b', b''
c, c', c'' are constant conversion factors.

It is also possible to mix these two methods and, for example, to derive one degree of freedom from one motion lever and two degrees of freedom from a special motion lever.

The positioning signals thus obtained, Sa, Sb and Sc, can if necessary be written on a data medium to be recalled at a later time either directly or provided with special processing. It is also conceivable that the control signals gained via the weighting for the individual drives or machines will be written on a data medium.

In the case of the embodiment example schematically represented in FIG. 3 of a device for implementing the method according to the invention the machines or drive motors are marked M1, M2, M3, ... Mx, which in the stage space are mounted above or below the stage, to drive the descending rope systems on which the complex structure to be moved is suspended or the lifting podiums on which the structure to be moved rests.

Each motor M1 ... x is fed the assigned overall control signal positioning signal Sm1 ... x. This is gained from the positioning signals Sa, Sb and Sc in the circuits designated W1, W2, W3, ... Wx according to equation (0). Each circuit W1 ... x is fed the same positioning signal Sa, Sb and Sc. The circuits W1 ... x are shown as individual switch blocks but can be part of a computer and in fact are in the preferred embodiment of the device for implementing the method according to the invention.

The signals Sa, Sb and Sc supplied to the supply lines to the circuits can be obtained in different ways. This is indicated by the multi-step switches 1, 2 and 3 in these supply lines.

In the drawn position k the switches 1, 2 and 3 link the circuits W1 ... x to the outputs Sa*, Sb* and Sc* of a circuit U, whose inputs can be connected via changeover switches 5, 6 and 7 either with the three motion switches F1, F2 and F3 or with the special motion switch SF. From the output signals of the special motion switch Sf or the output signals of the motion switches F1 . . . 3 or from a combination of these the circuit U derives the positioning signals Sa*, Sb* and Sc* according to the equations (1), (2) and (3). If the positioning signals Sa*, Sb* and Sc* are not changed, they corresponding to the signals SaT Sb and Sc fed to the circuits W1 . . . x. The circuit U may be part of the computer containing the circuits W1 . . . x.

The motion levers F1 .. . 3 can also be connected directly via switches 1, 2 and 3 in position m with the circuits W1 . . . x in order to control the drive motors M1 . . . x.

It is possible to store the positioning signals Sa, Sb and Sc on any kind of data medium 4. The positioning signals stored on the data medium 4 can then be fed directly later to the circuits W1 . . . x directly or after further processing in circuit 8 (indicated by changeover switch 9) for control to the drive motors M1 . . .x.

A further possibility of storage of the overall control signals Sm1 . . . x on a data medium and its later use for the direct control of the drive motors M1 . . . x should be mentioned here but is not shown in the drawings.

It is also possible to take the positioning signals Sa, Sb and Sc from an externally connected device.

I claim:

1. Method for moving, with at least three degrees of freedom, particularly in theatre area on or below a stage, a complex three-dimensional structure, which is borne by several lifting machines to be driven independently, means being provided for connecting each lifting machine to a respective point of application on the structure, method comprising:

three virtual parallel reference axes are installed in the space on each of which, as a function of a respective one positioning signal a respective point of application is moved up or down, a virtual surface is drawn by these points of application, several independent lifting machines are installed above or below and across this surface, a weighting is determined for each of said lifting machines as a function of its position compared to each reference axis, which weighting is a measure of the amount by which the running of the relevant machine is influenced by the movement of the points of application on the reference axes, in that the movement and speed of movement of each point of application on its associated reference axis is predefined as a positioning signal, partial control signals are created for each machine according to the proportions of the influence on it by the movement of the points of application via the weighting for the respective machine, the partial control signals for each machine are summated and fed to the individual associated machines as an overall control signal, a control lever which can execute at least three different, independent movements in space, such as rotation about the x-axis, rotation about the y-axis and translation along the z-axis, is used to predefine the positioning signals of the direction and speed of movement of the points of application on the reference axes.

2. Method according to claim 1, wherein the positioning signals for the points of application on the reference axes are stored on a data medium to enable an operator to learn a more or less complex movement in this way, to repeat that movement at a later point in time or to process it further in another way.

3. Method according to claim 1, wherein the overall control signals obtained from the summation of the partial control signals for the machines are stored on a data medium in order to enable an operator to learn a more or less complex movement in this way, to repeat that movement at a later point in time or to process it further in another way.

4. Method for moving, with at least three degrees of freedom, particularly in theatre area on or below a stage, a complex three-dimensional structure, which is borne by several lifting machines to be driven independently, means being provided for connecting each lifting machine to a respective point of application on the structure, the method comprising:

three virtual parallel reference axes are installed in the space on each of which, as a function of a respective one positioning signal a respective point of application is moved up or down, a virtual surface is drawn by these points of application, several independent lifting machines are installed above or below and across this surface, a weighting is determined for each of said lifting machines as a function of its position compared to each reference axis, which weighting is a measure of the amount by which the running of the relevant machine is influenced by the movement of the points of application on the reference axes, in that the movement and speed of movement of each point of application on its associated reference axis is predefined as a positioning signal, partial control signals are created for each machine according to the proportions of the influence on it by the movement of the points of application via the weighting for the respective machine, the partial control signals for each machine are summated and fed to the individual associated machines as an overall control signal, wherein said positioning signals of the direction and speed of movement of the points of application on the reference axes are predefined partly by using one or more control levers with one degree of freedom and partly by using a control lever which can execute at least three different, independent movements in space, such as rotation about the x-axis, rotation about the y-axis and translation along the z-axis.

5. Method according to claim 4, wherein the positioning signals for the points of application on the reference axes are stored on a data medium to enable an operator to learn a more or less complex movement in this way, to repeat that movement at a later point in time or to process it further in another way.

6. Method according to claim 4, wherein the overall control signals obtained from the summation of the partial control signals for the machines are stored on a data medium in order to enable an operator to learn a more or less complex movement in this way, to repeat that movement at a later point in time or to process it further in another way.

* * * * *